July 6, 1965     A. J. HAMBACH     3,193,209
PRECISION WINDER

Filed Sept. 14, 1961     13 Sheets-Sheet 1

INVENTOR
August J. Hambach

BY *Strauch, Nolan & Neale*
ATTORNEYS

July 6, 1965                A. J. HAMBACH                3,193,209
                            PRECISION WINDER
Filed Sept. 14, 1961                                13 Sheets-Sheet 3

INVENTOR
August J. Hambach

BY          *Strauch, Nolan & Neale*

ATTORNEYS

July 6, 1965
A. J. HAMBACH
3,193,209
PRECISION WINDER
Filed Sept. 14, 1961
13 Sheets-Sheet 4
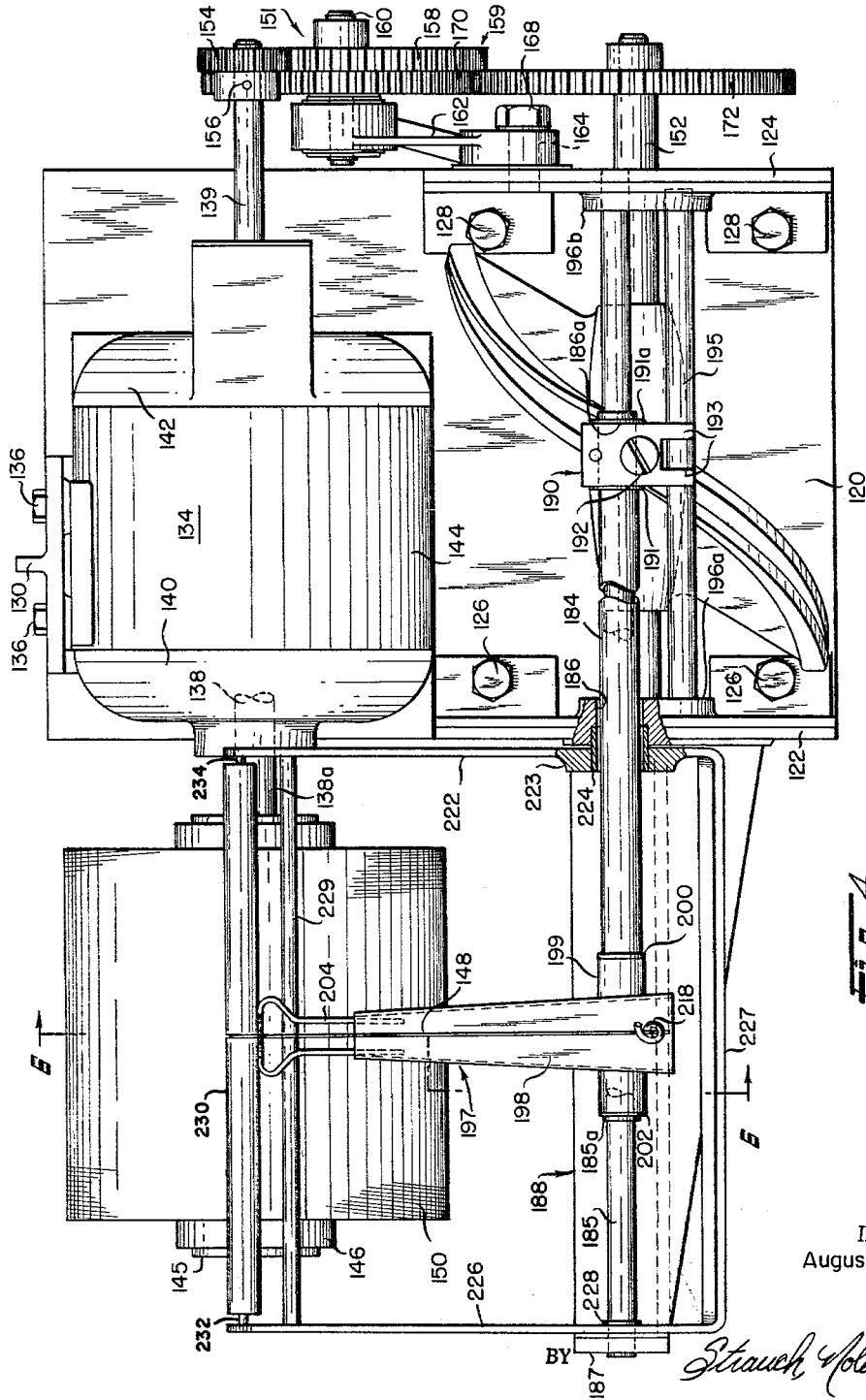
INVENTOR
August J. Hambach
BY Strauch, Nolan + Neale
ATTORNEYS July 6, 1965
A. J. HAMBACH
3,193,209
PRECISION WINDER
Filed Sept. 14, 1961
13 Sheets-Sheet 5
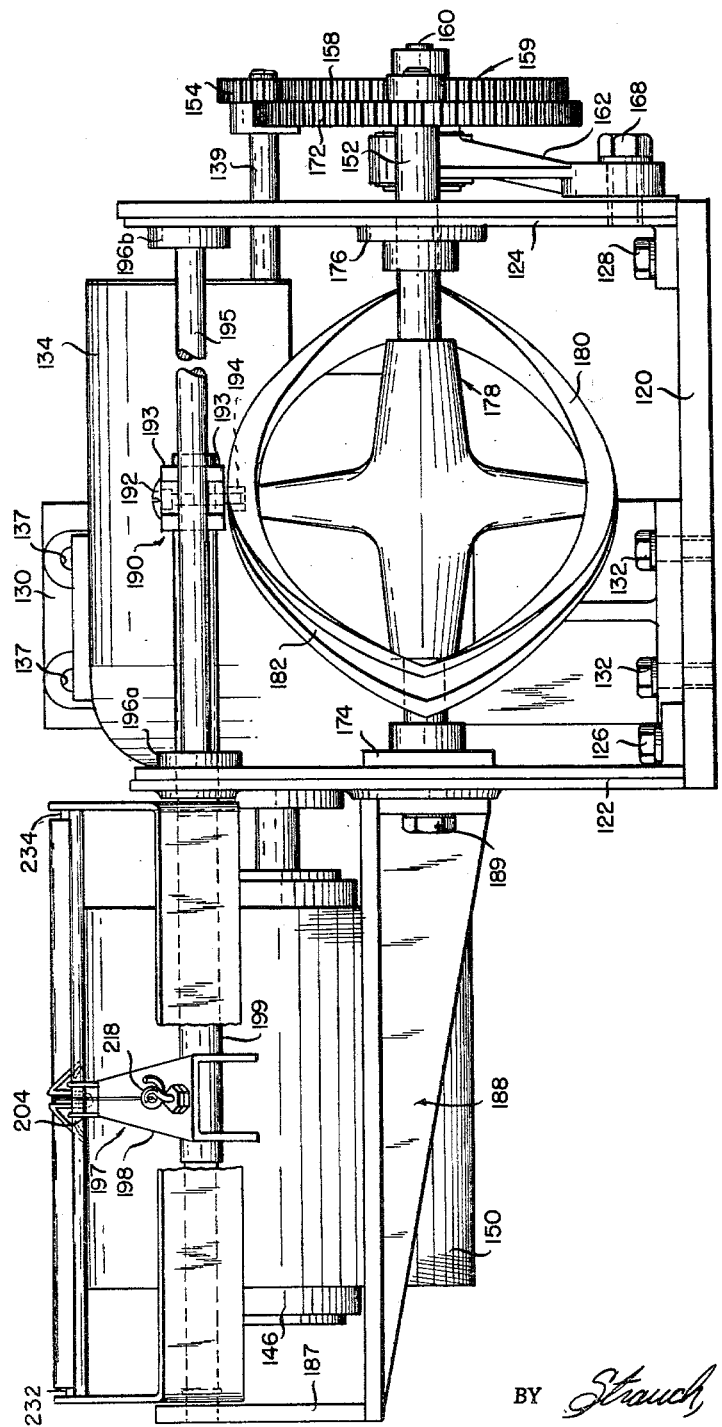
INVENTOR
August J. Hambach
BY *Strauch, Nolan & Neale*
ATTORNEYS

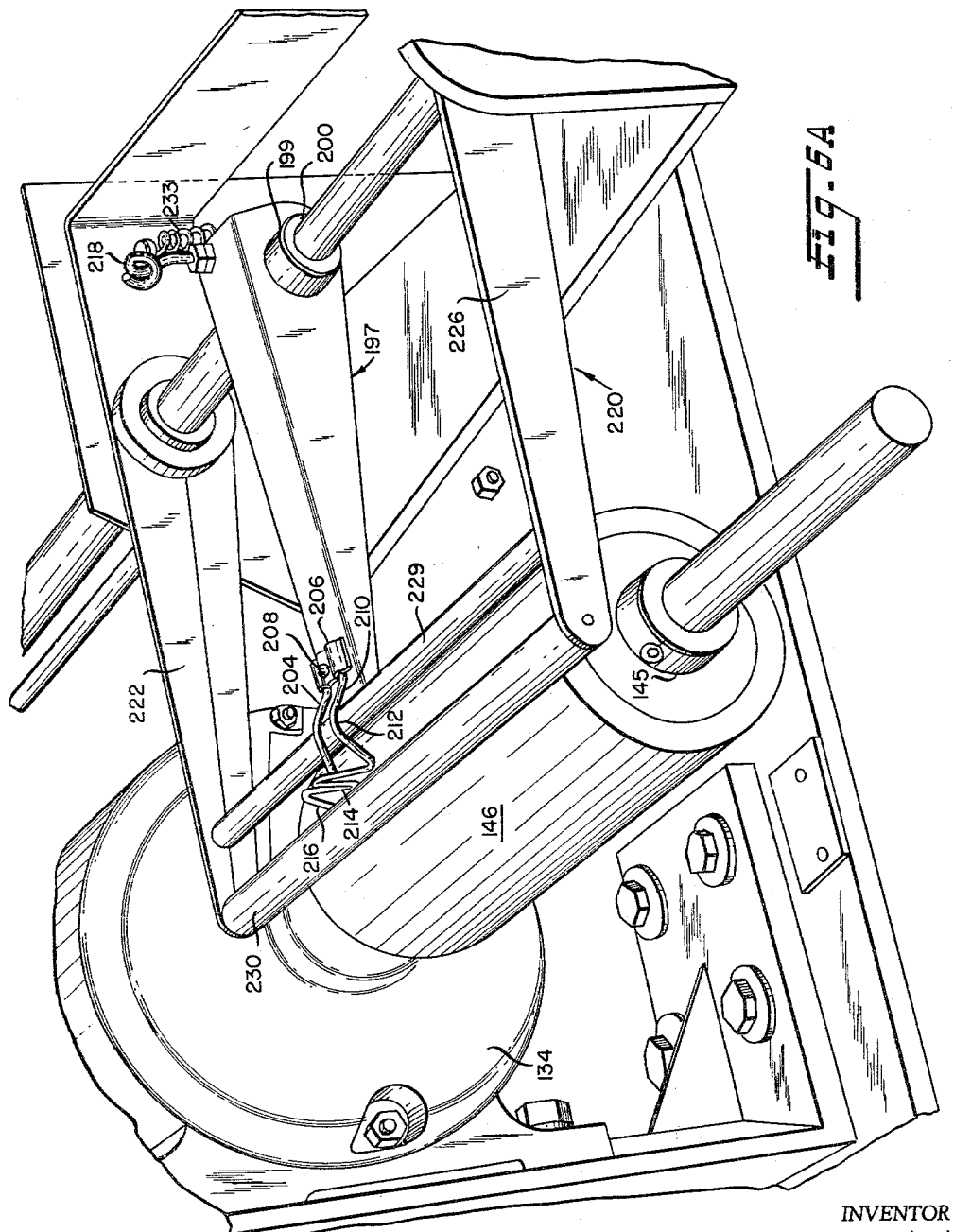
INVENTOR
August J. Hambach

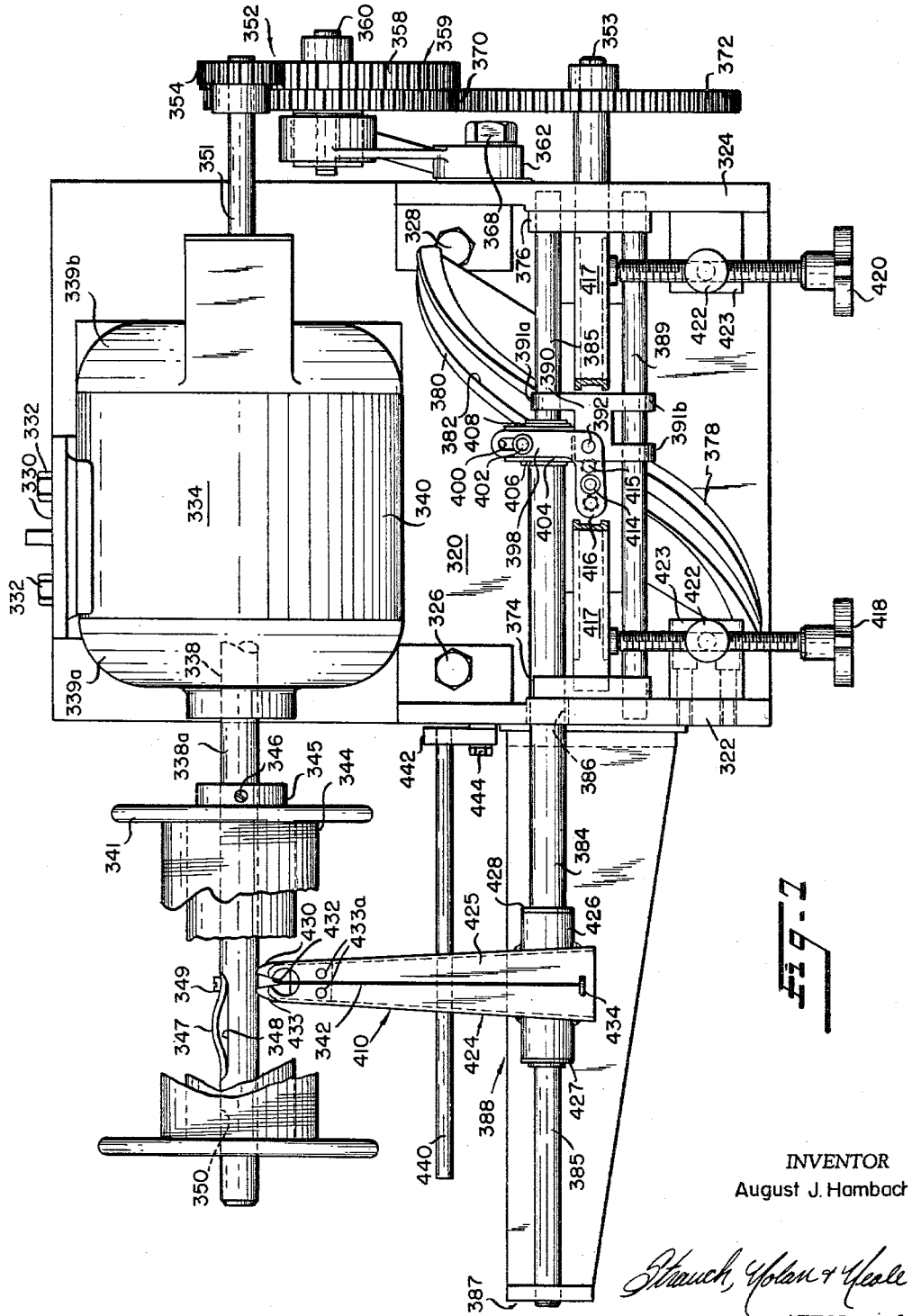

July 6, 1965 A. J. HAMBACH 3,193,209
PRECISION WINDER
Filed Sept. 14, 1961 13 Sheets-Sheet 8
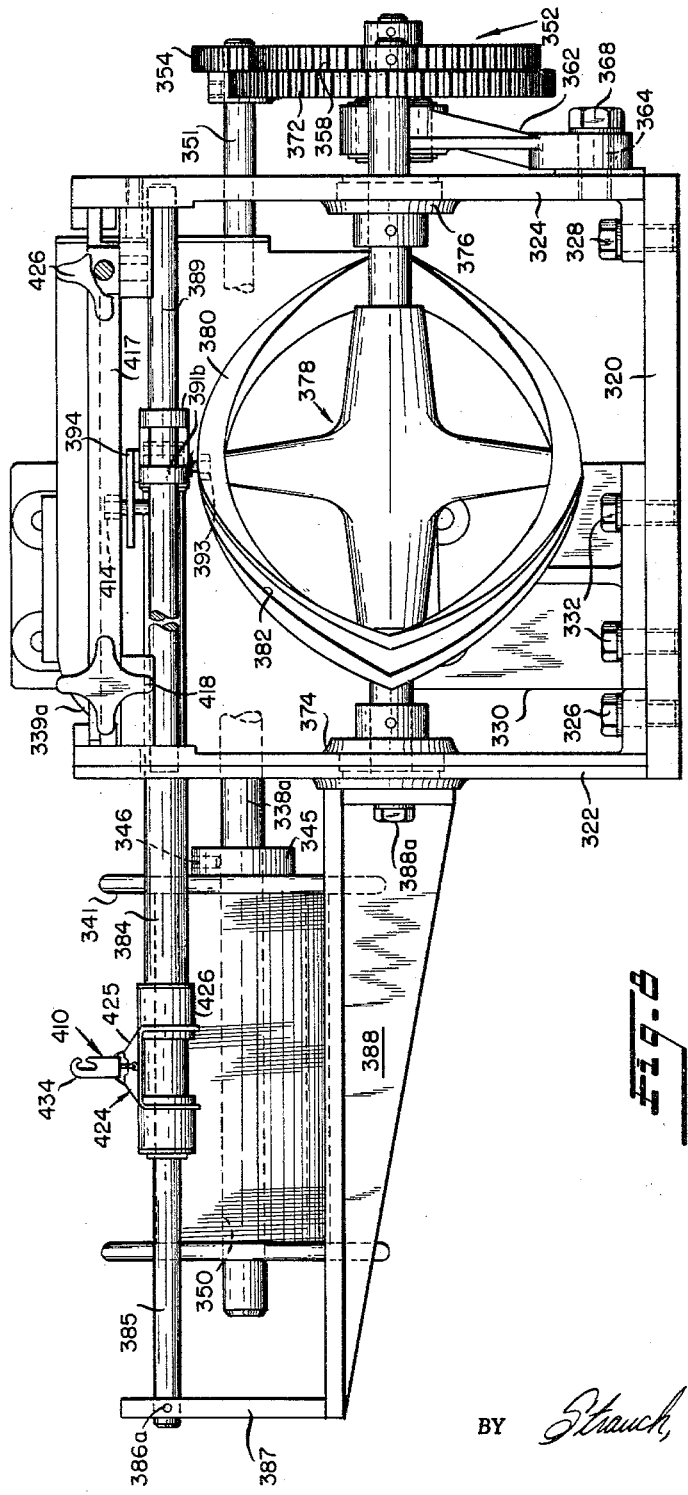
INVENTOR
August J. Hambach
BY *Strauch, Nolan & Yeale*
ATTORNEYS

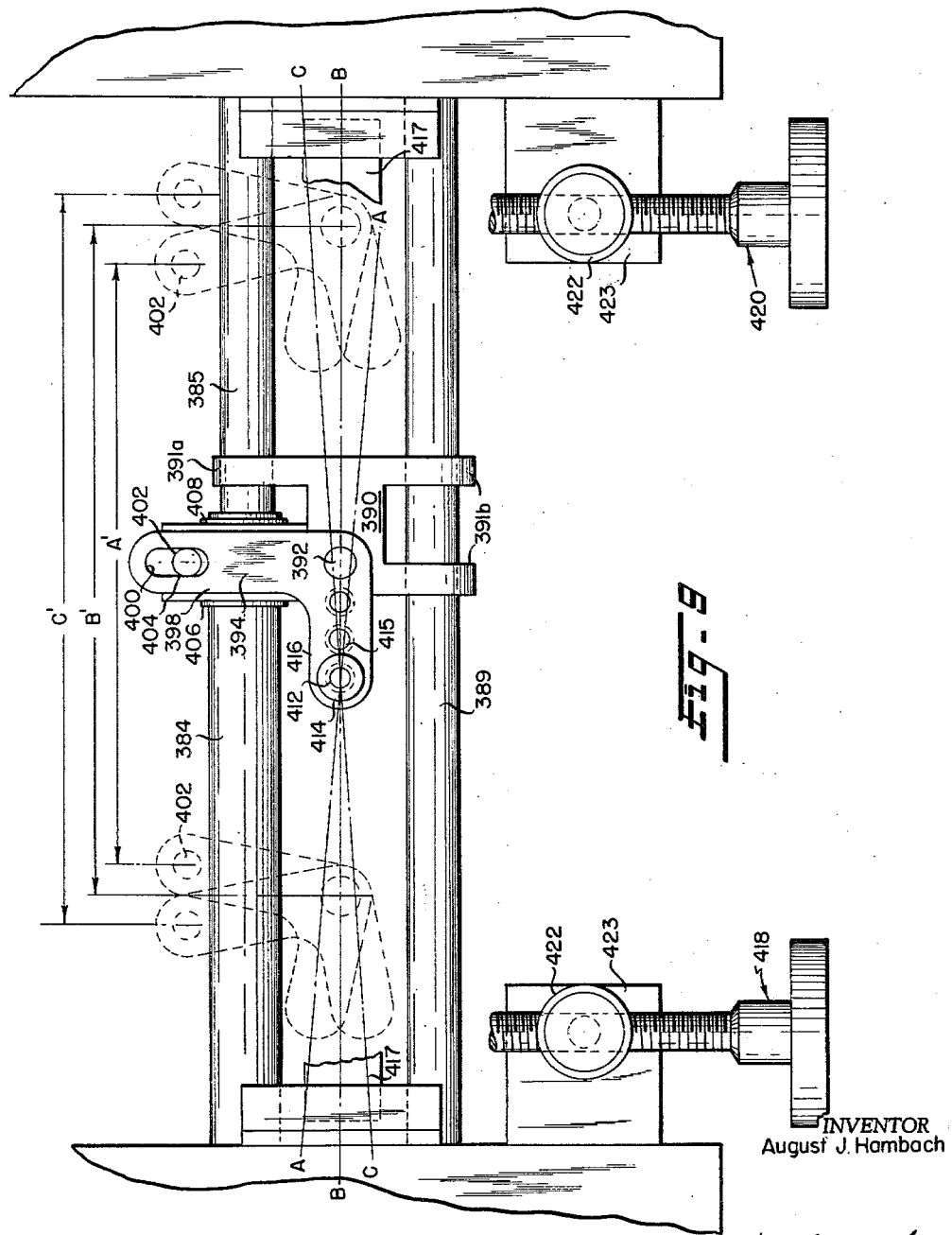

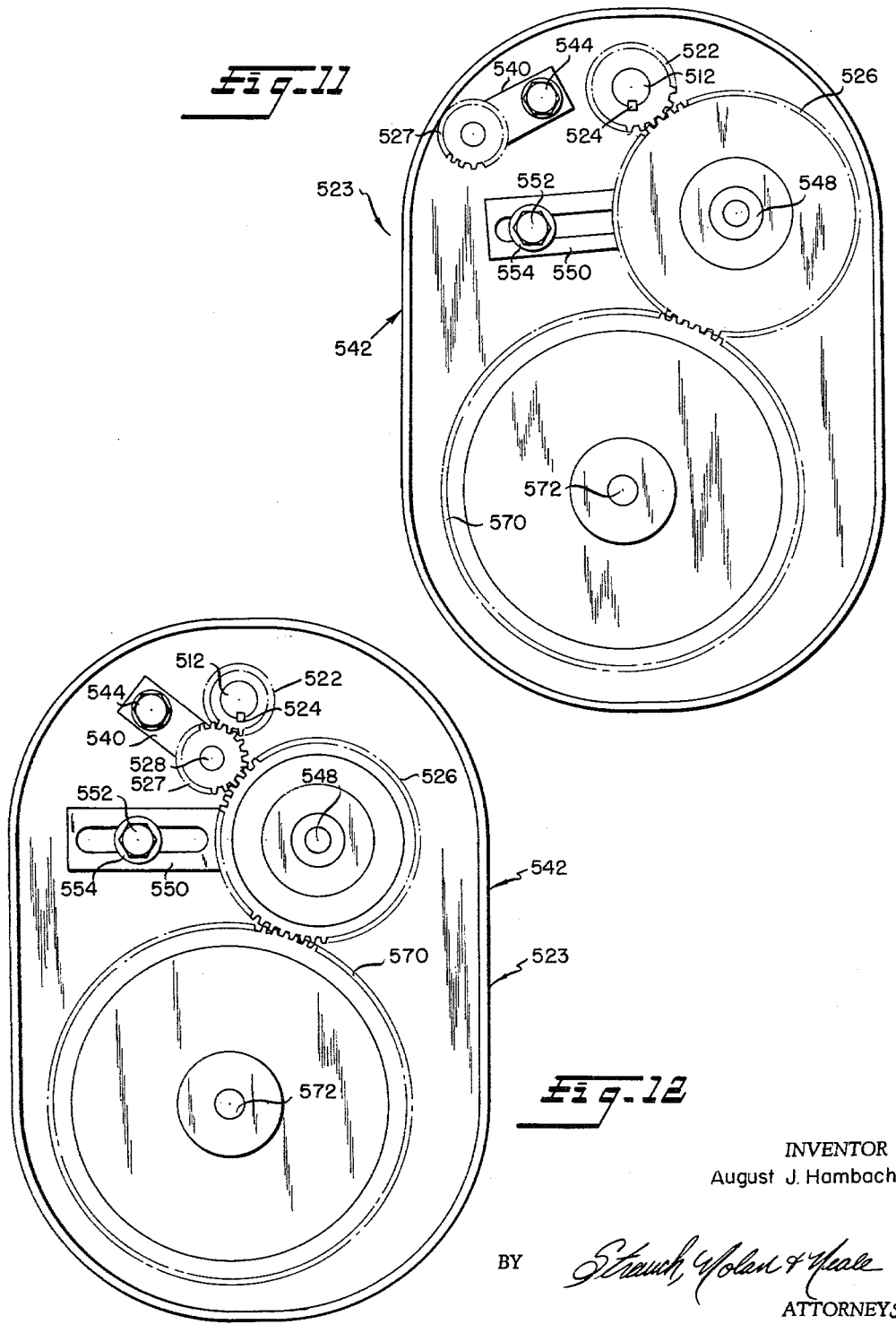

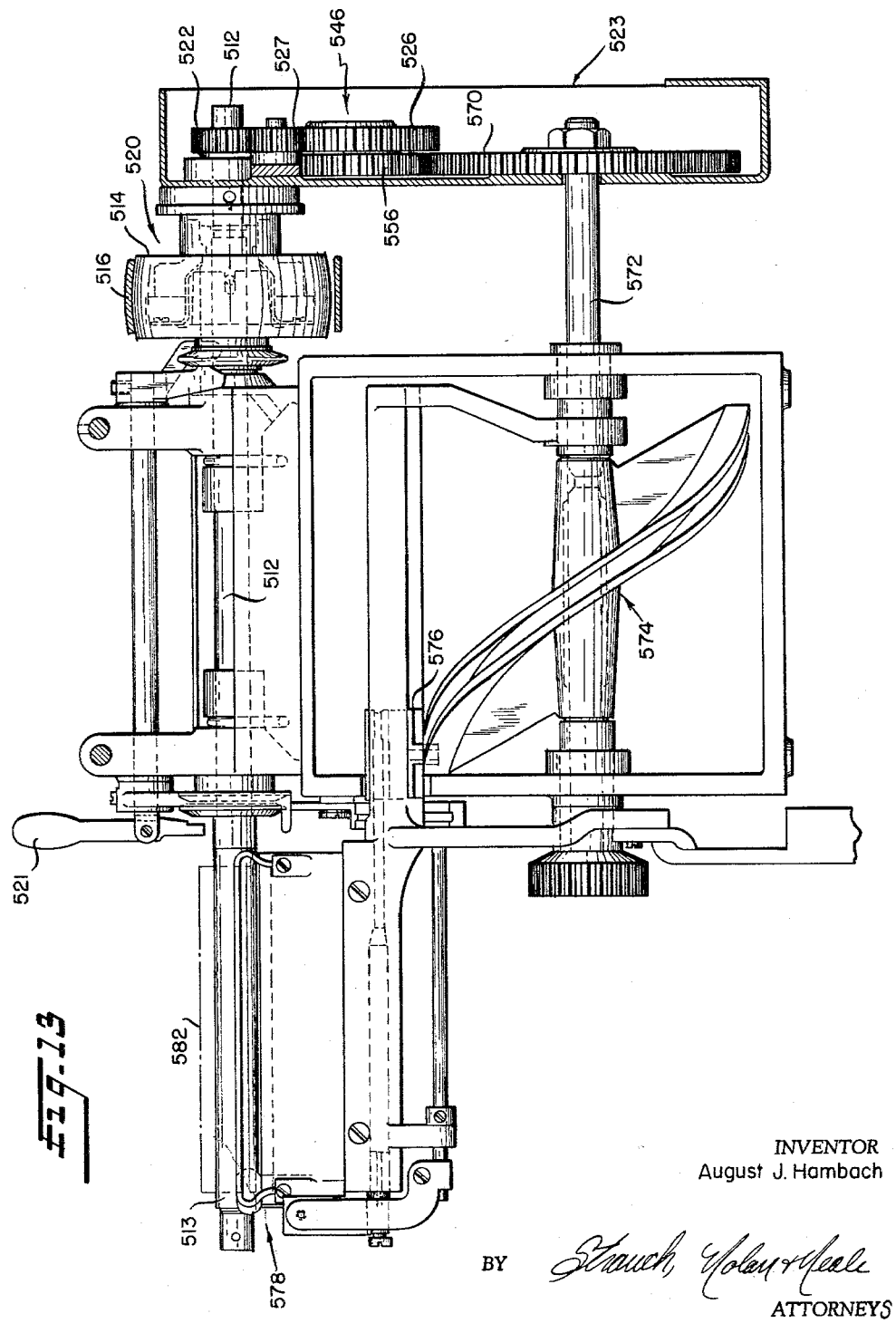

INVENTOR
August J. Hambach

BY Strauch, Nolan & Neale

ATTORNEYS

United States Patent Office 3,193,209
Patented July 6, 1965

3,193,209
PRECISION WINDER
August J. Hambach, Richmond, Va., assignor, by mesne assignments, to Maremont Corporation, Chicago, Ill., a corporation of Illinois
Filed Sept. 14, 1961, Ser. No. 138,166
10 Claims. (Cl. 242—18)

This invention relates to winding machines of the type used in the textile industry for winding thread, yarn, wire, and other strand material onto cops, cones, spools, and other similar packages. More specifically, this invention relates to winding machines of the type described above having a winding spindle supporting a rotatable package on which a thread is wound and a reciprocable guide for guiding a thread onto the package.

Winding machines of this type are well known. Typically, such a machine has a rotating winding spindle which mounts a rotatable package such as a tube or spool upon which the thread is wound. Either an electric motor or a belt drive is employed to rotate a shaft connected to the winding spindle. Generally, the winding spindle shaft is also connected through a gainer mechanism to a cylindrical cam which reciprocates a cam follower connected to the thread guide.

In winding a self-supporting yarn package on a rotatable package such as a tube or spool, several factors are important. One is the lay of the thread (i.e., the spacing of the thread within a layer or "wrap") which determines the amount of thread that can be wound onto a package. Another is the ratio between the speed of rotation of the winding spindle and the speed of reciprocation of the thread guide. The number of revolutions the winding spindle makes for one stroke of the thread guide across the length of the yarn package is called the point wind. For example, if the thread guide is moved once across the package while the winding spindle is making three revolutions the wind is referred to as a three point wind. It is apparent that if this exact ratio were used, each wrap of thread around the package would be laid exactly on top of the preceding wrap. This, of course, would produce a highly unstable package. Thus a third important factor is the gain or distance which one wrap of thread advances over the preceding wrap.

Commonly, the cam reciprocating the thread guide makes one half of a revolution for each stroke of the cam. Thus, for a three point wind, the ratio of winding spindle speed to cam speed is six to one. It is the function of the gainer mechanism to vary this ratio slightly above or below six to one so that each wrap is not laid exactly on top of the preceding one. By varying this ratio, the gainer mechanism causes the thread guide to make slightly more or less than one stroke for each three revolutions of the winding spindle. It is to be understood that winding machines in general and, in particular, winding machines in accordance with this invention are not limited to three point winds but that other winds may be selectively employed.

United States Patent Nos. 2,028,679, issued January 21, 1936, to W. Marcroft for "Winding Machines" and 2,079,730, issued to H. R. Blair May 11, 1937, for "Gainer Mechanism for Winding Machines" illustrate typical prior art gainer mechanisms. The type of gainer mechanism disclosed in these patents and illustrated schematically in FIGURE 16 hereof is commonly termed a gear gainer. The significant components of a gear gainer, as shown in FIGURE 16, are a driving gear S attached to a shaft W supporting the spindle, a driven gear C attached to the thread guide cam shaft, and an intermediate gear cluster D. The gear cluster D consists of a gear A intermeshed with gear S and a gear B rotatively fixed to gear A and intermeshed with gear C.

It will be obvious that if gears C and S are merely connected by an idler gear and if gear C has four times as many teeth as gear S, it will revolve once for every four revolutions of gear S. But this ratio may be changed by employing a gear cluster D in which gears A and B have different numbers of teeth. For example, in one winding machine constructed according to the present invention and set up for a two point wind, gear S had 30 teeth and gear C had 118 teeth (it will be remembered that the speed ratio between the winding spindle and cam shafts and, therefore, between gears S and C is twice the point wind since the cam moves the guide through two strokes each time it revolves). The table below illustrates the effect of various gear clusters on the speed ratio of gears S and C. In each of the examples in the table, the thread guide traveled more than one stroke for each four revolutions of the winding spindle. This extra distance is the gain which, as was pointed out above, equals the spacing between succeeding wraps on the thread packages.

| Teeth on Gear A | Teeth on Gear B | Gear Ratio Between Gears S and C | Gain in Inches |
|---|---|---|---|
| 59 | 58 | 4.001148 |  |
| 60 | 59 | 3.999999 |  |
| 64 | 63 | 3.995767 | .012 |
| 69 | 68 | 3.991176 | .025 |
| 74 | 73 | 3.987214 | .036 |
| 79 | 78 | 3.983760 | .046 |
| 82 | 81 | 3.981892 | .051 |

It is apparent, from the above table, that the desired gain may be obtained by employing a gear cluster having the proper combination of gears A and B.

The gear clusters appearing in the above table have from 58 to 82 teeth and, therefore have varying pitch diameters. To properly intermesh gears S and A and gears B and C, some means must be provided for adjusting the position of gear cluster D relative to gears S and C (which is fixedly positioned). Thus, in the patent to H. R. Blair, referred to above, the gear cluster is mounted on a shaft which may be adjustably positioned within the limits of an elongated slot. And in the previously referred to patent to Marcroft, the gear cluster is mounted on an arm which is pivotable about a stud.

It will be noted that both of these arrangements permit but a limited adjustment of the position occupied by the gear cluster. The arrangement exemplified by Blair limits the adjustment of gear cluster shaft to a path coincidental with the longitudinal axis of the slot. Similarly, the arrangement typified by Marcroft limits the position of the gear cluster shaft to a position along an arc of a circle having a radius equal to the distance between the centers of shafts. The limited range of adjustment of both of these arrangements necessarily limits the combinations of gears that can be employed in the gear cluster and, therefore, the range through which the gain of the winder may be varied.

In one aspect, therefore, this invention contemplates an improved gear gainer capable of producing a wider range of gain than the devices of the prior art. This is accomplished by mounting the gear cluster shaft upon a supporting arm which permits the shaft to be positioned not merely along a single axis, as in the prior art devices, but permits universal adjustment within a plane normal to the shaft's axis of rotation. Further, in the gear gainer in accordance with the present invention, the point wind is very readily changed by merely replacing gear S. Likewise, the gain may be readily changed by the replacement of gear cluster D. Accommodation of gears S having varying pitch diameters is obtained by a novel motor mount which permits the position of the shaft mounting gear S to be varied.

In the gear gainers disclosed by the prior art, as for example in the patent to W. Marcroft, referred to above, the gear driven by the power source meshes directly with one of the gears of the gear cluster. This further limits the range through which the gain may be adjusted since pairs of properly intermeshing gears must be employed. A further aspect of this invention, therefore, lies in the provision of a selectively positionable and engageable idler gear which may be interposed between the driven gear and the gear cluster, thereby making it possible to employ gear combinations which would otherwise not properly mesh.

To build a good thread package on a tube or similar package, the speed at which the thread is wound onto the package and the winding tension of the thread must be maintained uniform. Moreover, if the drive employed is effective to maintain the winding tension uniform, the conventional dancer rolls need not be employed. Thus as the diameter of the material builds up on the package, the motor driving the winding spindle must be slowed down to maintain the uniform tension and winding speed. The patents to W. Marcroft and H. R. Blair, referred to above, and United States Patent No. 2,116,409 issued May 3, 1938 to E. F. Parks for "Winding Machine" illustrate, respectively, the motor and belt drives heretofore employed. These drives have one common undesirable feature. In each, the driving member rotates the winding spindle at a constant speed regardless of the diameter of the material built up on the package. Thus, none of these power drives can maintain the winding speed or tension constant.

Accordingly, a further and important aspect of this invention lies in the provision of an especially designed single phase or polyphase electric motor which automatically slows down as the diameter of the material builds up on the package to maintain uniform tension and winding speed and to eliminate the need for dancer rolls.

Together with this novel motor, the present invention provides a novel motor control. In winding different types of threads upon varying types of packages, it is desirable to vary the winding speed and the winding tension. Accordingly, a further aspect of this invention resides in the provision of a novel electric motor control for varying the speed of the winding spindle and the thread tension.

Winding machines, of the type disclosed in this apppplication, are often used to wind synthetic yarn directly from extruders at constant yarn speeds. In this application, it is desirable that the winder pick up the yarn automatically after wrapping it around the spindle. A further aspect of this invention, therefore lies in the provision of a novel thread guiding mechanism for accomplishing this purpose.

This type of winding machine is likewise often employed to wind headless packages on cylindrical paper tubes and also to wind on spools. In order that such a machine may be employed with spools of different sizes, it is necessary to control the build-up between the flanges of the spools. To do this, a mechanism must be provided for contracting or expanding the traverse of the thread guide and for shifting it to one side or the other. Another aspect of this invention, therefore, lies in the provision of a novel adjusting mechanism for accomplishing the foregoing purpose.

The winders now commercially available are equipped with gear and belt gainers in which the gain is varied by moving toward or away from one another the two halves of a conventional split pulley. A motion transmitting belt travels over the split pulley and over a pulley operatively connected to a thread guide reciprocating mechanism. A typical gainer of this type is shown in the patent to Parks, referred to above. Since even a small adjustment of the split pulley has a pronounced effect on the speed ratio between the split and fixed pulleys, and since the gain is greatly changed by a slight change in this ratio, the desirable small changes in gain cannot be made.

Moreover, this type of gainer requires constant adjustment to keep the gain constant since variations in belt thickness, wear, and stretching of the belt, and even temperature variations effect the ratio. All of these disadvantages may be eliminated by substituting an all gear gainer for the gear and belt gainer. Accordingly, a further aspect of this invention contemplates the provision of an all gear gainer which may be readily substituted for the belt and gear gainer with which the present commercially available machines are equipped.

The primary objects of this invention include:

(1) The provision of an improved thread winding machine having a rotating package and a novel electric torque motor which will maintain uniform the speed and tension at which the thread is wound onto the package.

In conjunction with the above primary object a further object of this invention lies in the provision of a novel control mechanism for adjusting the winding speed and for adjusting the tension on the thread for any preselected winding speed.

(2) The provision of a thread winding machine of the type having a rotating package means, a reciprocating thread guide, and an improved gear gainer of simple construction which will permit adjustment of the gain through a wider range than has heretofore been possible.

(3) The provision of a winding machine having a reciprocating thread guide and novel means for lengthening, shortening and shifting to one side or the other the traverse of the thread guide.

(4) The provision of a winding machine having a rotating spindle and an improved type of thread guiding mechanism which will automatically pick up the yarn after wrapping it around the spindle.

(5) The provision of an all gear gainer which may be readily substituted for the belt and gear gainers employed in the present commercially available winding machines.

These and other objects of the present invention will become more fully apparent by reference to the appended claims and as the following detailed description proceeds in reference to the accompanying drawings wherein:

FIGURE 4 is a top plan view of a second embodiment of the invention adapted for self-threading;

FIGURE 5 is a front elevational view of the winder of FIGURE 4;

FIGURE 6A is a perspective view of the structure shown in FIGURE 6;

FIGURE 7 is a top plan view of a precision winder which is a combination unit adapted for use either in winding a headless package on parallel paper tubes or in winding onto spools directly from an extruder;

FIGURE 8 is a front elevational view of the winder of FIGURE 7;

FIGURE 9 is a fragmentary view taken substantially along line 9—9 of FIGURE 8 showing the traverse width adjusting mechanism;

FIGURE 11 is a side elevational view of the gear gainer of the apparatus of FIGURE 10 showing the gear gainer in one of its selectively adjustable configurations;

FIGURE 12 is a view similar to FIGURE 11 showing a second selectively adjustable configuration of the gear gainer;

FIGURE 13 is a front elevational view of a belt-driven winder equipped with a universally applicable, infinitely variable gear gainer;

*First embodiment*

Figure 1:
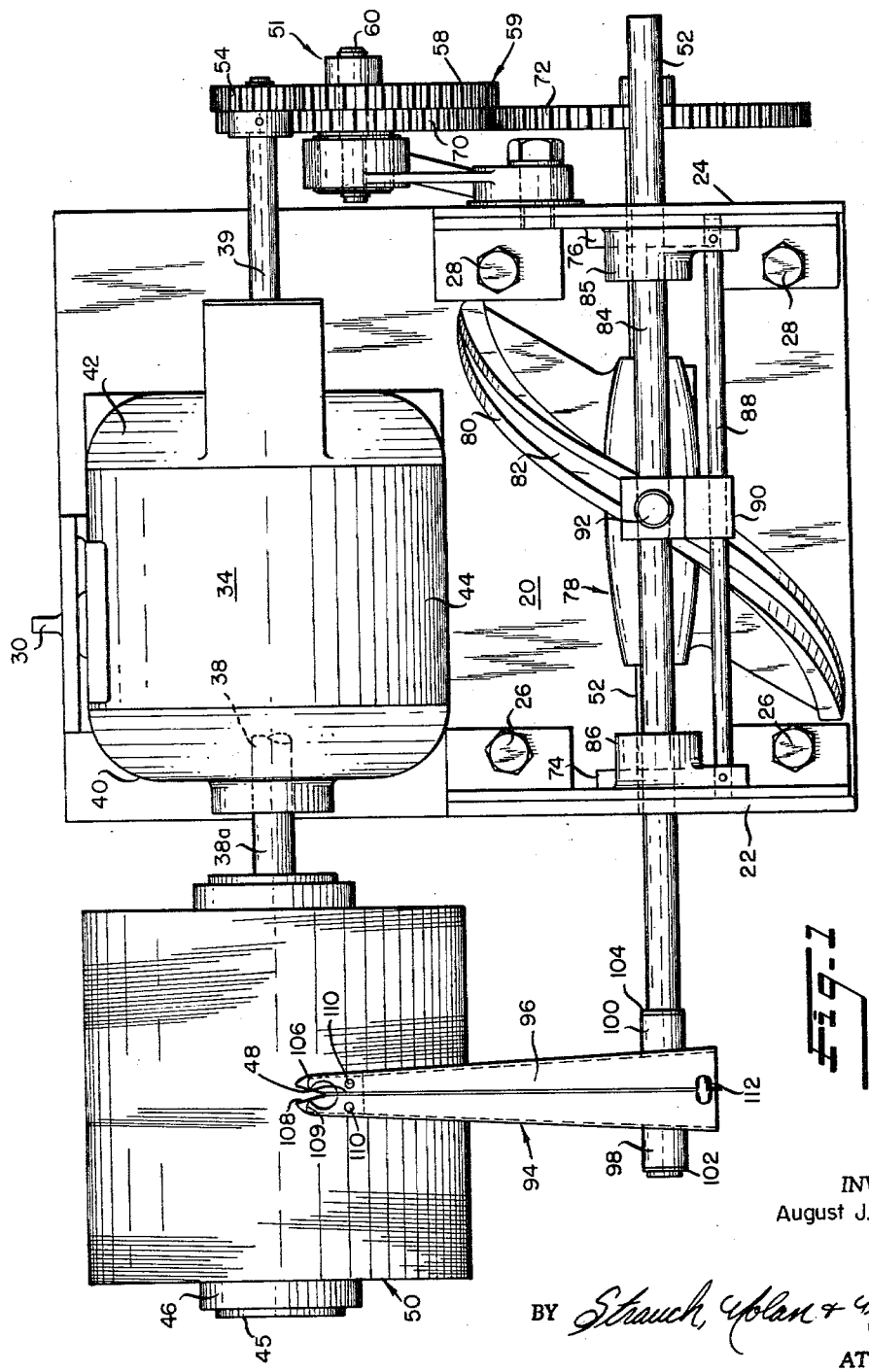
FIGURE 1 is a top plan view of the basic form of precision winder constructed in accord with the principles of the present invention.
Figure 2:
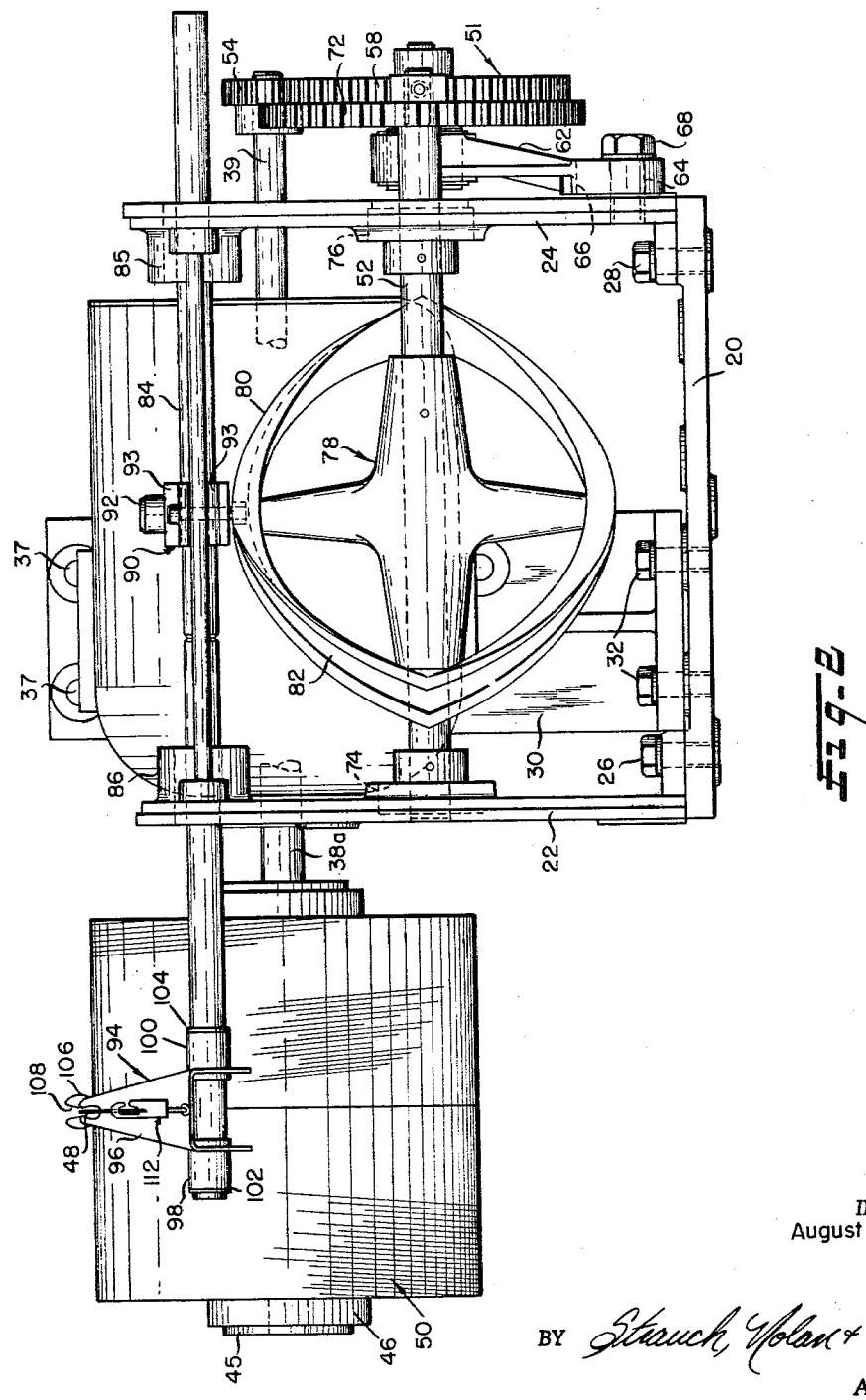
FIGURE 2 is a front elevational view of the winder shown in FIGURE 1.
Figure 3:
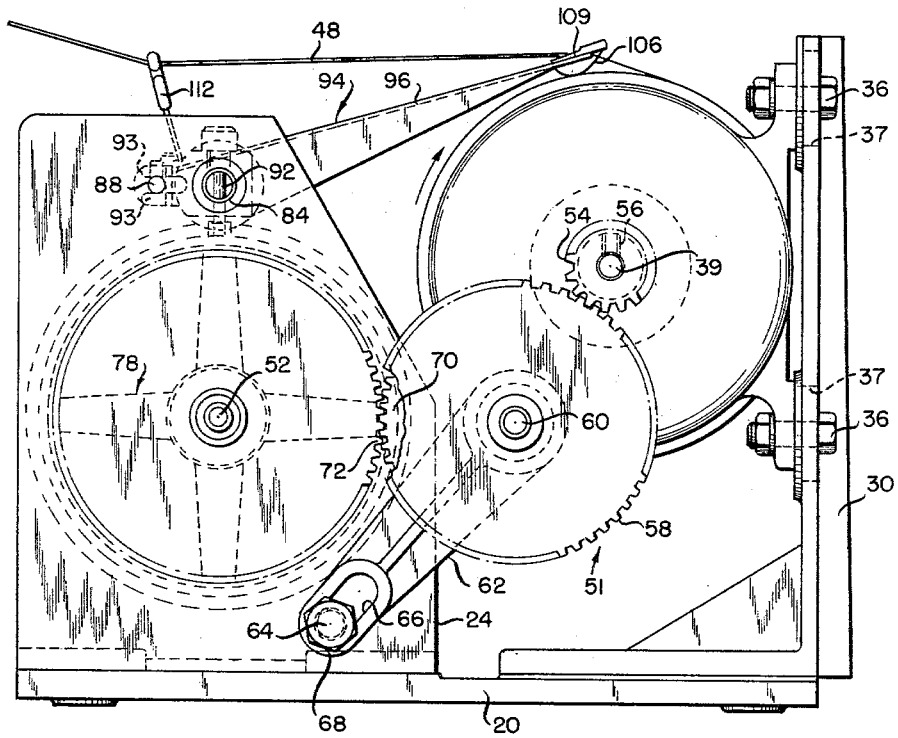
FIGURE 3 is a right side elevational view of the winder shown in FIGURES 1 and 2.

Referring now to the drawings, and particularly to FIGURES 1-3, the first embodiment of the precision winder in accord with the principles of the present invention embodies, in general, a motor driven spool or tube supporting mandrel cooperating with a cam actuated, reciprocating, traverse rod mounted thread guide to wind a filament or thread upon the spool or tube. This structure is supported by a base plate 20 having upstanding, parallel, bearing supporting side plates 22 and 24 fixed thereto by machine screws 26 and 28 and an upstanding rear motor support plate 30 fixed thereto by machine screws 32.

An especially designed, electric, torque motor 34, the structure, control and operation of which will be described presently, is mounted upon rear support plate 30 by bolt assemblies 36 extending through vertically elongated slots 37 in the plate, and providing for vertical adjustment of the position of motor 34 relative to the base plate 20 as is most clearly shown in FIGURE 3. The rotor (not shown) of the motor 34 has an elongated shaft 38 the opposite ends 38a and 39 of which project coaxially from the end bells 40 and 42 of the casing 44 of motor 34. Fixed to the lefthand extension 38a of shaft 38 (which comprises a winding spindle) is a mandrel 45 forming a support for a paper tube 46 upon which the thread 48 is to be wound to form a wound package 50.

The oppositely extending end 39 of shaft 38 forms the power input shaft for a variable gear gainer mechanism 51 connecting the power shaft 39 with a shaft 52 upon which the traverse rod reciprocating cam is mounted. As is best shown in FIGURE 3, a pinion 54, fixed to the end of the shaft extension 39 by a pin or set screw 56, is the power input element of mechanism 51. Pinion 54 is in constant mesh with a gear 58 which forms one element of a gear cluster 59 journalled, and detachably mounted, upon a stub shaft 60 carried by a bracket 62. Bracket 62 is adjustably fixed to side plate 24 by a stud bolt 64 extending through an elongated slot 66 in member 62 and a coacting lock nut 68. A further gear 70, journalled upon the stub shaft 60 and fixed for rotation with the gear 58, forms the other element of gear cluster 59 and is in constant mesh with a gear 72 fixed to the end of cam shaft 52.

Cam shaft 52 is journalled upon side frames 22 and 24 by axially aligned bearings 74 and 76. A conventionally formed traverse rod reciprocating cam 78, having a cylindrical rim 80 in which is formed a continuous helical groove 82, is rotatably fixed to cam shaft 52 intermediate side frames 22 and 24.

As is best shown in FIGURES 1 and 2, a tubular traverse rod 84 is mounted on frame members 22 and 24 by bearing assemblies 85 and 86 for axial reciprocation relative thereto. A cross head guide bar 88 is fixed at its opposite ends to bearing members 85 and 86 in parallel relation to the axis of the traverse rod 84. A cross head 90 is operatively connected to cam 78 by a pin 92 extending through the cross head and through hollow traverse rod 84 into engagement with cam groove 82. Cross head 90 is fixed by pin 92 to traverse rod 84. Guide bar 88 is embraced by the arms 93 (FIGURES 2 and 3) of cross head 90 and is operative to restrain traverse rod 84 and cross head 90 against pivotal movement in bearings 85 and 86 while permitting free axial reciprocation of these elements under control of cam 78.

A cast thread guide assembly 94 comprising a channel-shaped arm portion 96 and collar portions 98 and 100 integral therewith and projecting from opposite sides thereof in surrounding relation to the traverse rod 84, is axially fixed and pivotally mounted on the traverse rod between retaining rings 102 and 104. At its free end, thread guide assembly 94 has an extremely hard ceramic, or equivalent, thread guide insert 106 formed with a thread receiving V-notch 108 for the thread 48. Insert 106 is resiliently retained against the bottom of the arm 96 by a bifurcated flat spring 109 fixed to the bottom of arm 96 by screws 110. At its pivoted end, arm portion 96 supports an upstanding, hook-shaped thread guide 112, as is best shown in FIGURE 2.

The construction of the motor 34 is such that it will impose a constant tension upon the thread 48 as it is fed to the package 50. It is apparent that, for this purpose, motor 34 must rotate more slowly as the diameter of the package 50 increases with the build-up of yarn 48 thereon. Suitable motors having the foregoing characteristics are manufactured by the A. B. Wesche Electric Company of Cincinnati, Ohio. The performance characteristics of these motors are discussed in an article entitled "Torque Motors and Brakes," printed in the April 1957 issue of Product Engineering.

The ratio of the rate of reciprocation of guide 94 to the rate of rotation of winding spindle 38a (the point wind) is maintained constant at the preselected desired value by the positive control exerted by the gear gainer mechanism 51 comprising pinion 54, gear cluster 59, and gear 72.

As is apparent from FIGURE 3, the speed ratio between the motor shaft 39 (and hence winding spindle 38a) and the cam shaft 52 (and, therefore, the point wind) can be readily adjusted to any desired magnitude by employing a pinion 54 having the proper number of teeth. The gain is readily adjusted, in small increments, through a wide range, by replacing gear cluster 59. The arm 62 is adjustable laterally and pivotally with respect to bolt 64 to properly position stub shaft 60 in relation to shafts 39 and 52 to accommodate the pitch diameters of the various selected pinions 54 and the gears 58 and 70 in the gear clusters 59.

This first embodiment is adapted primarily for winding upon parallel paper tubes.

*Second embodiment*

The second embodiment of the precision winder in accord with the principles of the present invention shown in FIGURES 4, 5, 6 and 6A, is adapted for use in winding synthetic yarn directly from an extruder at a constant yarn speed in the order of from 50 to 150 yards per minute. This embodiment features a novel thread guiding mechanism which provides automatic yarn pickup as soon as tension is established. This embodiment is mounted on a base plate 120 having upstanding parallel bearing support side plates 122 and 124 fixed thereto by machine screws 126 and 128 and an upstanding rear motor support plate 130 fixed thereto by machine screws 132.

Figure 6:
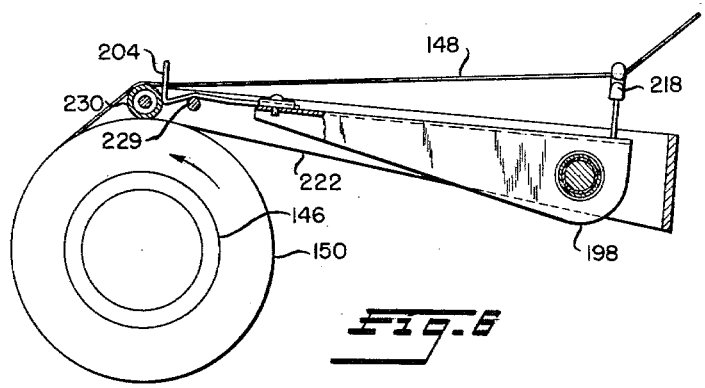
FIGURE 6 is a fragmentary sectional view of the thread guide and mandrel of the winder of FIGURE 4 taken substantially along line 6—6 of FIGURE 4.

An electric torque motor 134, the structure, control and operation of which is substantially the same as that of motor 34, is vertically adjustably mounted upon rear support plate 130 by bolt assemblies 136 extending through vertically elongated slots 137 in the plate. The rotor (not shown) of the motor 134 has an elongated shaft 138, the opposite ends 138a and 139 of which project coaxially from the end bells 140 and 142 of the casing 144 of motor 134. The lefthand extension 138a of shaft 138 (which comprises a winding spindle) carries a mandrel 145 to support the paper tube 146 (not shown in FIGURE 6A) upon which the thread 148 is to be wound to form the package 150 as shown in FIGURES 4, 5 and 6. The oppositely extending end 139 of the shaft 138 forms the power input shaft for a gear gainer mechanism 151 connecting power shaft 139 with the cam shaft 152.

As is best shown in FIGURE 4, a pinion 154 is fixed to the end of the shaft extension 139 by a pin or set screw 156. Pinion 154 is in constant mesh with a gear 158 forming one element of a gear cluster 159 journalled upon a stub shaft 160 carried by a bracket 162 adjustably fixed to the side plate 124 by a stud bolt 164 extending through an elongated slot (not shown) in the member 162 and a coacting lock nut 168. This slot in member 162 is identical to the slot 66 in member 62 of the first embodiment. Journalled upon stub shaft 160 and fixed for rotation with the gear 158 is a further gear 170. Gear 170 is in constant mesh with a gear 172 fixed to the end of cam shaft 152.

Cam shaft 152 is journalled by aligned bearings 174 and 176 upon side frames 122 and 124. A conventionally formed traverse rod reciprocating cam 178, having a cylindrical rim 180 in which is formed a continuous groove 182, is fixed to cam shaft 152 intermediate bearings 174 and 176.

As is best shown in FIGURE 4, a tubular traverse rod 184 is axially slidably mounted upon a coaxial rod 185 which is fixed at one end to frame member 124 and extends through an aperture 186 in member 122. At its opposite end rod 185 is attached to the end of the upstanding arm 187 of an auxiliary frame bracket 188 fixed to member 122 by bolts 189 (see FIGURE 5). Sleeve-like plastic inserts 185a and 186a are mounted within the ends of rod 184 to serve as bearings for traverse rod 184 with respect to fixed rod 185. A cross head 190 is secured in fixed axial relationship to traverse rod 184 by split retaining rings 191 and 191a. Cross head 190 is operatively connected to cam 178 by a slotted head pin 192, which extends downwardly through horizontally extending cross head arms 193, and a cylindrical cam roller 194 which is freely rotatably mounted on the lower end of pin 192 and engages helical cam groove 182. Cam groove 182 supports roller 194 on the lower end of pin 192.

Arms 193 embrace a cross head guide bar 195 fixed, at its opposite ends, to bearing members 196a and 196b formed as embossments on frame members 122 and 124 (FIGURES 4 and 5), thus preventing pivotable movement of cross head 190 while permitting it and traverse rod 184 to reciprocate freely under the control of cam 178.

Thread guide assembly 197 comprises a unitary casting having a channel-shaped portion 198 integral with a bushed sleeve 199 which is pivotally journalled on and axially fixed to traverse rod 184 by split retaining rings 200 and 202. A thread guide 204 is attached to the free end of assembly portion 198 by a clamp 206 and a screw 208. Thread guide 204 comprises a unitary member having two leg portions 210, which are parallel at their outer ends and are bent first upwardly and then downwardly to form V-shaped, bar receiving loops 212 intermediate their outer and inner ends. At the apex of the loops 212, they are bent outwardly as well as downwardly, thus providing an increased span between the leg portions 210 at their inner ends. Legs 210 terminate at their inner ends in a transversely disposed V-shaped, upwardly open thread receiving portion 214 disposed between outwardly and downwardly inclined leg connecting portions 216.

A thread guide 218, identical to thread guide 112 (see FIGURE 3) is fastened to the pivoted end of member 198.

In this embodiment of the invention, thread receiving portion 214 of thread guide 204 is maintained in a predetermined spaced relationship to tube 146 by a roller assembly 220. Assembly 220 has an elongated, inwardly extending support arm 222. Arm 222 is pivotally mounted on casting member 122 by a sleeve bearing 224, the projecting end of which is received in a boss 223 on arm 222. Bearing 224 surrounds traverse rod 184 in spaced relation to provide a clearance therebetween to avoid restraint upon the reciprocation of rod 184. Similarly, axially aligned support arm 226 is pivotally mounted on fixed rod 185 adjacent upstanding arm 187 of auxiliary bracket 188 by a sleeve bearing 228. The outer ends of arms 222 and 226 are rigidly connected by an integral transversely extending member 227. A support rod 229 is rigidly mounted between support arms 222 and 226 parallel to and spaced outwardly from a roller 230. As is best shown in FIGURE 6, support rod 229 is located directly beneath and supports loops 212 of thread guide 204.

Roller 230 is mounted for rotational movement between and adjacent the inner ends of support arms 222 and 226 by pins 232 and 234. As is seen in FIGURES 6 and 6A, roller 230 rests upon tube 146 when it is empty and upon the outer wrap of the wound package 150 as the thread 148 is wound upon the tube.

For incompressible yarns, such as plastic, in order to prevent roller 230 from bearing with undue force upon package 150 a spring 233 connected at its upper end to the outer end of support arm 222 and at its lower end to side plate 122 biases roller 230 in a clockwise direction to counterbalance the weight of assembly 220. For compressible yarns in order to wind a tight and compact package, the spring 233 may be connected between side plate 122 and arm 222 to bias assembly 220 against the package.

The construction of the motor 134 is substantially the same as that of motor 34 and, like motor 34, it will always impose a constant tension upon the thread 148 as it is fed to the package 150, rotating more slowly as the diameter of the package 150 increases with the buildup of yarn 148 thereon. The rate of rotation of the mandrel forming end 138a of the shaft 138 (which is the winding spindle) is positively controlled by the gear train comprising pinion 154, gear cluster 159 and gear 172.

As in the embodiment of FIGURES 1–3, the speed ratio between the motor shaft 139 (and, hence, winding spindle 138a) and cam shaft 152 (and, therefore, the point wind) can be adjusted to any desired magnitude by employing a pinion 154 having the proper number of teeth. The gain is readily adjusted in small increments through a wide range by replacing gear cluster 159. Arm 162 is adjustable laterally and pivotally with respect to bolt 164 to properly position stub shaft 160 in relation to the shafts 139 and 152 to accommodate the pitch diameters of the various selected pinions 54 and the gears 158 and 170 in the gear clusters 159.

*Third embodiment*

The third embodiment of the precision winder in accord with the principles of the present invention as shown in FIGURES 7 through 10 comprises a combination winder adapted to wind filaments or threads directly from an extruder onto flanged spools or onto parallel-walled paper tubes. This embodiment features a novel thread guide adjusting mechanism for expanding and contracting the traverse of the thread guide and for shifting the traverse to one side or the other. This embodiment is mounted on a base plate 320 having upstanding, parallel, bearing support side plates 322 and 324 fixed thereto by machine screws 326 and 328 and an upstanding rear motor support plate 330 fixed thereto by machine screws 332.

An electric torque motor 334 the structure, control, and operation of which is substantially the same as that of motors 34 and 134, is vertically, adjustably mounted upon rear support plate 330 by bolt assemblies (not shown) which are substantially the same as bolt assemblies 36 in FIGURE 3. The rotor (not shown) of motor 334 has an elongated shaft 338, the opposite ends of which project coaxially from the end bells 339a and 339b of the casing 340 of motor 334. The lefthand extension 338a of shaft 338 (which comprises a winding spindle)

supports a spool 341 upon which the thread 342 is to be wound to form a package 344. Spool 341 abuts a collar 345 axially fixed to winding spindle 338a by a set screw 346. A spring 347, mounted in a recess 348 in winding spindle 338a by a screw 349, presses against the peripheral surface of an axial bore 350 extending longitudinally of spool 341 to hold the spool in place on spindle 338a. The oppositely extending end 351 of the shaft 338 forms the power input shaft for a gear gainer mechanism 352 connecting power shaft 351 to a cam shaft 353. A pinion 354 is fixed to end 351 of shaft 338 by a pin or set screw (not shown). Pinion 354 is in constant mesh with a gear 358 forming one element of a gear cluster 359 journalled upon a stub shaft 360. Shaft 360 is carried by a bracket 362 which is adjustably fixed to side plate 324 by a stud bolt 364 extending through an elongated slot (not shown) in the member 362 and a coacting lock nut 368. The slot in member 362 is identical to the slot 66 in member 62 (see FIGURE 3). Journalled upon the stub shaft 360 and fixed for rotation with gear 358 is a further gear 370 which is in constant mesh with a gear 372 fixed to the end of cam shaft 353.

Cam shaft 353 is journalled, by aligned bearings 374 and 376, upon side plates 322 and 324. A conventionally formed traverse rod reciprocating cam 378, having a cylindrical rim 380 in which is formed a continuous helical groove 382, is fixed to cam shaft 353 intermediate bearings 374 and 376.

As is best shown in FIGURES 7 and 9, a tubular traverse rod 384 is axially, slidably mounted upon a coaxial rod 385. Rod 385 is fixed at one end to plate 324, extends through an aperture 386 in plate 322, and at its opposite end, is attached by a set screw 386a to an upstanding arm 387 of an auxiliary bracket 388 fixed to plate 322 by bolts 388a (see FIGURE 8). A cross head guide bar 389, mounted in parallel relation to the axis of the traverse rod 384, is fixed at its opposite ends to side plates 322 and 324. As is best shown in FIGURE 7, a cross head 390 is slidably mounted on rod 385 and cross head guide bar 389, cross head leg 391a surrounding rod 385 and cross head legs 391b surrounding guide bar 389.

A cam roller stud 392 (see FIGURE 10) extending vertically through and attached to cross head 390 and a cam roller 393 rotatably mounted on the lower end of stud 392 and extending into cam groove 382 operatively connect the cross head to cam 378. Thus coaxial rod 385 and guide bar 389 permit cross head 390 to reciprocate freely under the control of cam 378, but prevent it from pivoting about either of these members.

Figure 10:
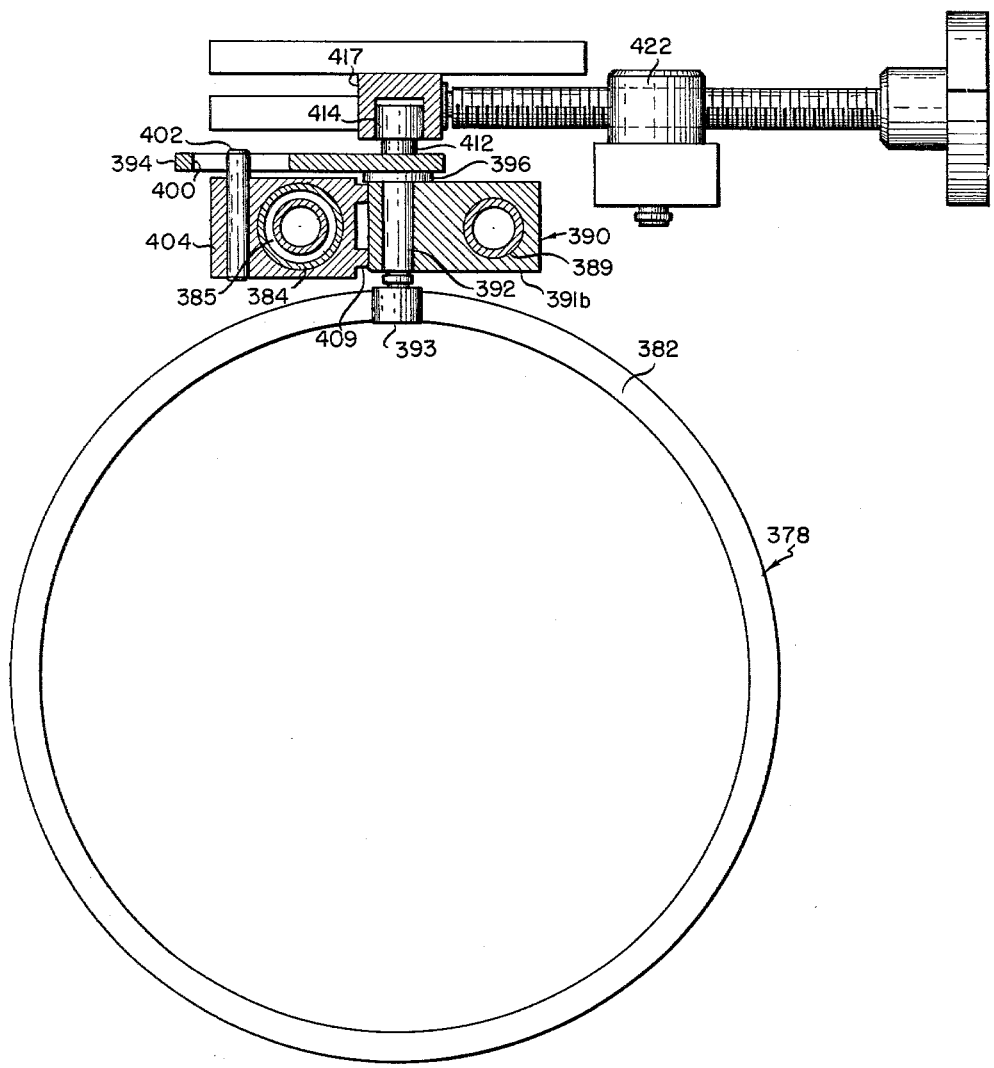
FIGURE 10 is a fragmentary sectional view taken substantialy along line 10—10 of FIGURE 9.

Cam roller stud 392, which extends above cross head 390, pivotally mounts a horizontally disposed bell crank 394 which is horizontally positioned in vertically spaced relationship to cross head 390 by a flat annular spacer 396. A longitudinal slot 400 (see FIGURES 7 and 9) in a motion transmitting arm 398 of bell crank 394 is engaged by the upper end of a vertical pin 402 secured in and extending upwardly from a reciprocating block 404 mounted on and axially fixed to one end of traverse rod 384 by split retaining rings 406 and 408. As is best shown in FIGURE 10, a pair of horizontally disposed, integral projections 409 on block 404 slidingly engage cross head 390 and prevent block 404 from rotating about rod 385. Axially fixed at the opposite end of traverse rod 384 is a thread guide assembly 410 (FIGURE 7) which will be described presently.

When the thread 342 is wound on flanged spools, it is necessary, in order to control the buildup between the flanges, to contract and expand the traverse of thread guide assembly 410 and/or to shift the traverse axially of the spool 341. The mechanism for accomplishing this function is shown in FIGURES 9 and 10.

As was explained above, bell crank arm 398 transmits the reciprocatory motion of cross head 390 through pin 402 to block 404 and thus to the traverse rod 384 to which it is connected. A vertically extending stud 412, carrying at its upper end a roller 414, is threaded in one of the tapped holes 415 in arm 416 of bell crank 394. Roller 414 engages the side walls of, and reciprocates in, a track 417 fastened at one end to a knurled feed screw 418 and at the other to a knurled feed screw 420. Feed screws 418 and 420 are mounted for travel in a direction substantially normal to the axis of traverse rod 384 in internally threaded lugs 422 secured to outstanding projections 423 on side plates 322 and 324, respectively.

By the appropriate manipulation of feed screws 418 and 420 the center line of track 417 may be made to lie, for example, along lines A—A, B—B, or C—C (FIGURE 9). When track 417 is located with its center line in position B—B, i.e., parallel to traverse rod 384, the traverse of thread guide assembly 410 will be equal to the traverse of traverse rod 384, the traverse of pin 402, and, therefore, the throw of cam 378. However, when track 417 is shifted to the position A—A, the traverse stroke will be smaller than the cam throw. When track 417 is shifted to position C—C, the traverse stroke will be larger than the cam throw for reasons which will be explained presently.

In FIGURE 9 the distance B' is equal to the throw of cam 378. The distance A' represents the limits of travel of pin 402 when track 417 is shifted to position A—A. This distance is equal to the traverse stroke of thread guide assembly 410 since pin 402 is axially fixed to, and reciprocates with, block 404 (and, therefore, thread guide assembly 410). Similarly, the distances B' and C' are equal to the traverse when track 417 is shifted to positions B—B and C—C, respectively. In each of these three exemplary positions, track 417 compels roller 414 to follow a predetermined path. By following such path, roller 414 causes crank 394 to be displaced in the manner shown in FIGURE 9. By moving but one of the lead screws 418 or 420, it is possible to shift but one end of track 417, thereby enlarging or contracting the traverse stroke and, at the same time, leaving one of the limits of the stroke undisturbed. It is also possible, by appropriate manipulation of lead screws 418 and 420, to shift the traverse limits (for example A' and A") to one side or the other while maintaining the distance between them constant.

Thread guide assembly 410, referred to above, comprises a bushed casting 424 having a channel-shaped portion 425 rigidly attached to a sleeve portion 426 which is pivotally mounted on and axially fixed to traverse rod 384 by split retaining rings 427 and 428 for reciprocation therewith. At its free end thread guide assembly 410 mounts an extremely hard ceramic or equivalent thread guide insert 430 formed with a thread receiving V-notch 432 for the thread 342. Insert 430 is resiliently retained against the bottom of a bifurcated flat spring 433 fixed to the bottom of arm portion 425 by screws 433a. At its pivoted end, arm portion 425 supports an upstanding hook-shaped thread guide 434, as is best shown in FIGURE 8.

Intermediate its free pivoted ends, arm portion 425 rests upon an axially extending, arm positioning, support rod 440 which is fastened to one end of a mounting member 442. The opposite end of member 442 is pivotally attached to upstanding plate 322 by a cap screw 444. This arrangement permits thread receiving V-notch 432 to be spaced a preselected distance from package 344.

The construction of the motor 334 is substantially the same as that of motors 34 and 134 and, like these motors, it will always impose a constant tension upon the thread 342 as it is fed to the spool 341 by rotating more slowly as the diameter of the spool 341 increases with the build-up of yarn 342 thereon. The rate of reciprocation of thread guide 410 in relation to the rate of rotation of the mandrel forming extension (or winding spindle) 338a of shaft 388 of the motor 334 is positively controlled by the gear train comprising pinion 354 and gear cluster 359 and gear 372.

As in the embodiments illustrated in FIGURES 1–3 and 4-6, the speed ratio between the motor shaft 351 (and, hence, winding spindle 338a) and the cam shaft 353 (and, therefore, the point wind) can be adjusted to any desired magnitude by employing a pinion 354 having the proper number of teeth. The gain is readily adjusted, in small increments, through a wide range, by replacing gear cluster 359. Arm 362 is adjustable laterally and pivotally with respect to bolt 364 to properly position stub shaft 360 in relation to the shafts 351 and 353 to accommodate the pitch diameters of the various selected pinions 354 and the gears 358 and 370 in the gear clusters 359.

*Fourth embodiment*

The fourth embodiment of the precision winder in accord with the principles of the present invention, shown in FIGURES 11–13, features a gear gainer which may be readily substituted for a gear and belt gainer in an existing winder machine. The winding machine illustrated is of the conventional type disclosed in detail in the patent to Blair, referred to above. In general a shaft 512 (FIGURE 13), mounting a pulley 514 which is driven by a belt 516 connected to any conventional power source, forms the power input shaft for a gear gainer mechanism, and, at its left hand end, supports a winding mandrel 513. A clutch assembly 520, operated by a shaft lever 521, selectively connects pulley 514 in driving relationship to shaft 512.

In the present invention, a pinion 522 of a gear gainer 523 is fixed to the end of power input shaft 512 by a key 524. Pinion 522 is in constant mesh with a gear 526, either directly, as shown in FIGURE 11, or through an idler gear 527, as shown in FIGURE 12. Gear 527 is mounted on a stub shaft 528 which is fastened to one end of an arm 540 pivotally attached to casing 542 of gainer 523 by screw 544. Gear 526 forms one element of a gear cluster 546 journalled and detachably mounted upon a stub shaft 548 carried by a bracket 550. Bracket 550 is slidably and pivotally mounted on casing 542 by a screw 552 and a washer 554.

A further gear 556, journalled upon stub shaft 548, forms the other element of gear cluster 546 and is fixed for constant rotation with gear 526. Gear 556, in turn, is in constant mesh with a gear 570 which is attached to a cam shaft 572. As in the embodiments of FIGURES 1–10 of this application and in the patent referred to above, cam shaft 572 rotatably mounts a cam 574 which is operatively connected to and reciprocates a traverse bar 576. Connected to traverse bar 576 for reciprocation therewith is a conventional thread guide assembly 578 for guiding a thread onto a paper tube 582 supported on mandrel 513.

As is apparent from FIGURES 12 and 13, the speed ratio between the power input shaft and winding spindle 512 and the cam shaft 572 (and, therefore, the point wind) can be adjusted to any desired magnitude by employing a pinion 522 having the proper number of teeth. The gain is readily adjusted, in small increments, through a wide range, by replacing gear cluster 546. Arm 550 is adjustable laterally and pivotally with respect to the screw 552 to properly position the stub shaft 548 in relation to the shafts 512 and 572 to accommodate the pitch diameters of the various selected pinions 522 and gears 526 and 556 in gear clusters 546. Pivotally mounted idler gear 527 provides added flexibility to the gear gainer since it permits the concurrent use of particular pinions 522 and gears 526 which would otherwise not properly mesh.

*Torque motor control*

Figure 14:
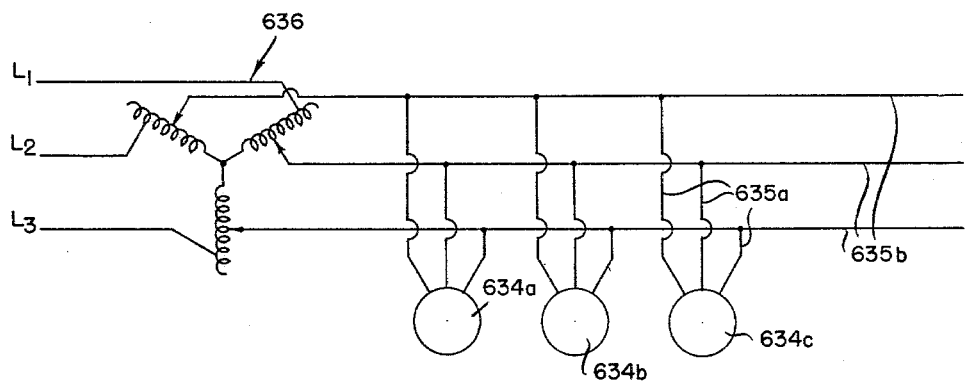
FIGURE 14 is a schematic illustration of a torque motor control in accordance with the present invention.

FIGURE 14 illustrates schematically a torque motor control in accordance with the present invention. Torque motors 634a–c, which are connected in parallel by appropriate leads 635a and 635b to the windings of a polyphase variable transformer 636 are, as pointed out above, special single phase or polyphase induction motors designed to maintain a constant winding speed and a uniform tension on the material being wound. The torque speed characteristic of these motors is such that, as the diameter of the material builds up on the tube on which it is being wound, the motor automatically slows down to maintain a uniform tension and a constant speed.

It is a further characteristic of a torque motor of this type that the torque it produces is directly proportional to the voltage input to the motor for a given synchronous speed (which may be 900 r.p.m., for example). Thus it is apparent that by appropriately adjusting the output voltage of variable transformer 636, any desired winding tension may be established for a given motor speed.

Single phase and polyphase synchronous torque motors, including the type herein disclosed, conventionally comprise a stator having a plurality of poles wound thereon. Generally, these motors are so arranged that the synchronous speed of the motor may be changed by changing the number of poles.

*Modified torque motor control*

Figure 15:
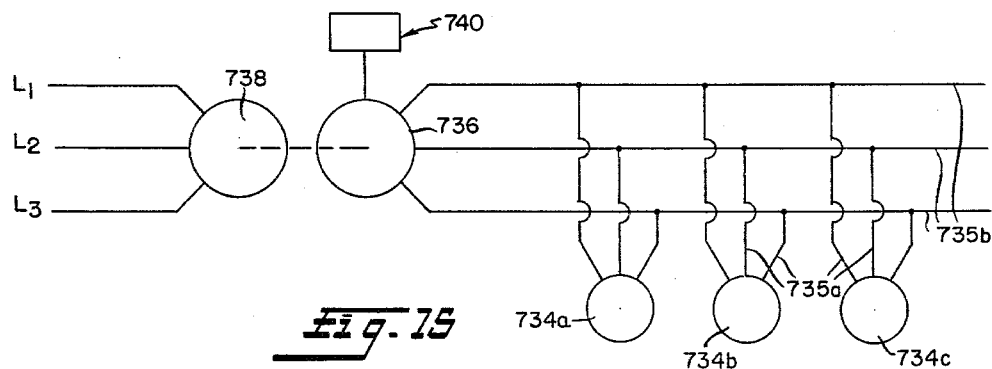
FIGURE 15 is a schematic illustration of a modified torque motor control.
Figure 16:
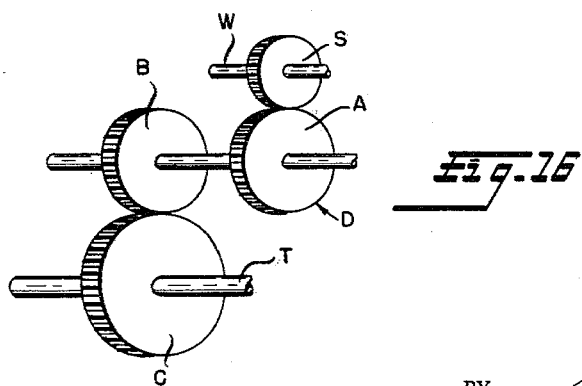
FIGURE 16 is a schematic illustration of a gear gainer in accordance with the principles of the present invention.

FIGURE 15 illustrates, schematically, a torque motor control providing increased flexibility in winding speeds. In this embodiment, torque motors 734a–c are connected by suitable leads 735a and 735b to the armature windings of a polyphase alternator or synchronous generator 736 driven by a variable speed motor 738 of suitable construction.

The frequency of the output current supplied by the armature winding of a synchronous generator is directly proportional to the speed of rotation of the armature. And the synchronous speed of a synchronous motor is directly proportional to the frequency of the current supplied to it. Hence, it will be readily apparent that the speed of torque motors 734a–c may be varied through a wide range by adjusting the speed with which motor 738 drives alternator 736.

Alternator 736 is provided with a field control, which may, as is the conventional practice, comprise a rheostat, for changing the field current and, therefore, the generated voltage. As was explained in connection with the torque motor control illustrated in FIGURE 14, the torque produced by a torque motor is directly proportional to the input voltage. Therefore, by appropriately adjusting field control 740, any desired winding tension may be established for any of the infinite torque motor speeds that may be obtained by varying the speed of motor 738.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread winding machine comprising:
   (a) rotatable means for supporting a package adapted to have a thread wound thereon;
   (b) reciprocable means for guiding a thread onto said package;
   (c) operating means for reciprocating said thread guiding means relative to said package;
   (d) a motor drive-connected to said package supporting means and to said operating means for simultaneously rotating said package supporting means and effecting reciprocation of said thread guiding means and for maintaining the winding tension substantially constant for a given thread delivery speed; and
   (e) ratio establishing means operably interposed between said motor and said operating means for selectively and accurately establishing the number of revolutions made by said package for each traverse of said package made by said thread guiding means; the improvements wherein:

(f) said motor is a torque motor;
(g) said torque motor has torque-speed characteristics determined solely by its internal construction; and
(h) said torque motor is the sole means for maintaining the winding tension constant.

2. A thread winding machine as set forth in claim 1, including means for selectively varying the winding tension comprising means for varying the operating voltage applied to said torque motor.

3. A thread winding machine as set forth in claim 2, wherein said means for selectively varying said voltage comprises a variable transformer electrically connected to said motor.

4. A thread winding machine as set forth in claim 2, wherein said means for varying said voltage comprises an alternator electrically connected to said motor and means for varying the field current in said alternator.

5. Gainer mechanism for thread winders of the type having a rotating package means adapted to have a thread wound thereon, reciprocable means for guiding a thread onto said package means, and power means including a shaft for rotating said package means, comprising:
(a) a first gear of selectively variable pitch diameter adapted to be rotated by said shaft;
(b) a selectively variable gear assembly comprising a pair of axially aligned, relatively rotatably fixed gears of dissimilar pitch diameters, one of said pair of gears being operatively associated with said first gear;
(c) a second gear operatively associated with the second member of said pair of gears and adapted to be directly connected in driving relationship to said reciprocable thread guiding means;
(d) a member mounted for universal movement in a plane normal to the axis of alignment of the members of said gear assembly;
(e) means mounting said gear assembly on said member;
(f) a selectively positionable idler gear adapted to be operatively interposed between said first gear and the gear operatively associated therewith; and
(g) selectively operable means for maintaining said member immovable after the members of said gear assembly have been positioned in operative relationship with said first or idler gears and said second gear; and
(h) said first and second gears, said idler gear, and the members of the gear assembly being the sole gears in said gainer mechanism.

6. The gear gainer mechanism of claim 5 including means pivoted at one end thereof about an axis parallel to the axis of alignment of the members of said gear assembly, means mounting said idler gear upon an oppositely disposed end of said pivoted means, and selectively operable means for maintaining said pivoted means non-pivotable when said idler gear is operatively associated with said first gear means and said first member of said gear assembly.

7. A thread winding machine as set forth in claim 1, including means for selectively varying the thread winding speed, comprising means for supplying alternating current to said torque motor and means for varying the freqency of said current.

8. A thread winding machine as set forth in claim 7, wherein said frequency varying means comprises an alternator electrically connected to said torque motor and variable speed driving means mechanically drive connected to said alternator.

9. The thread winding machine of claim 1, wherein said ratio establishing means comprises:
(a) a first gear of selectively variable pitch diameter adapted to be rotated by said torque motor;
(b) a selectively variable gear assembly comprising a pair of axially aligned, relatively rotatably fixed gears of dissmiilar pitch diameters, one of said pair of gears being operatively associated with said first gear;
(c) a second gear operatively associated with the second member of said pair of gears and directly connected in driving relationship to said operating means;
(d) a member mounted for universal movement in a plane normal to the axis of alignment of the members of said gear assembly;
(e) means mounting said gear assembly on said member; and
(f) selectively operable means for maintaining said member immovable after the members of said gear assembly have been positioned in operative relationship with said first and said second gears;
(g) said first and second gears and the members of the gear assembly being the sole gears in said gainer mechanism.

10. The gear gainer mechanism of claim 9, including:
(a) a selectively positionable idler gear adapted to be operatively interposed between said first gear and the gear operatively associated therewith;
(b) means pivoted at one end thereof about an axis parallel to the axis of alignment of the members of said gear assembly;
(c) means mounting said idler gear upon an oppositely disposed end of said pivoted means; and
(d) selectively operable means for maintaining said pivoted means non-pivotable when said idler gear is operatively associated with said first gear means and said first member of said gear assembly.

References Cited by the Examiner
UNITED STATES PATENTS

| | | | |
|---|---|---|---|
| 1,961,524 | 6/34 | Nenninger. | |
| 2,028,679 | 1/36 | Marcroft | 74—679 |
| 2,079,730 | 5/37 | Blair | 74—421 |
| 2,116,410 | 5/38 | Parks | 242—18 |
| 2,296,959 | 9/42 | Swanson | 242—45 |
| 2,372,136 | 3/45 | Swift et al. | 242—43 |
| 2,459,064 | 1/49 | Davis. | |
| 2,711,859 | 6/55 | Hobourn | 242—43 |
| 2,915,254 | 12/59 | Weber et al. | 242—45 |

FOREIGN PATENTS 11,795 of/99 Great Britain.

DONALD W. PARKER, *Primary Examiner.*

JOSEPH P. STRIZAK, RUSSELL C. MADER, MERVIN STEIN, *Examiners.*